Figure 1:
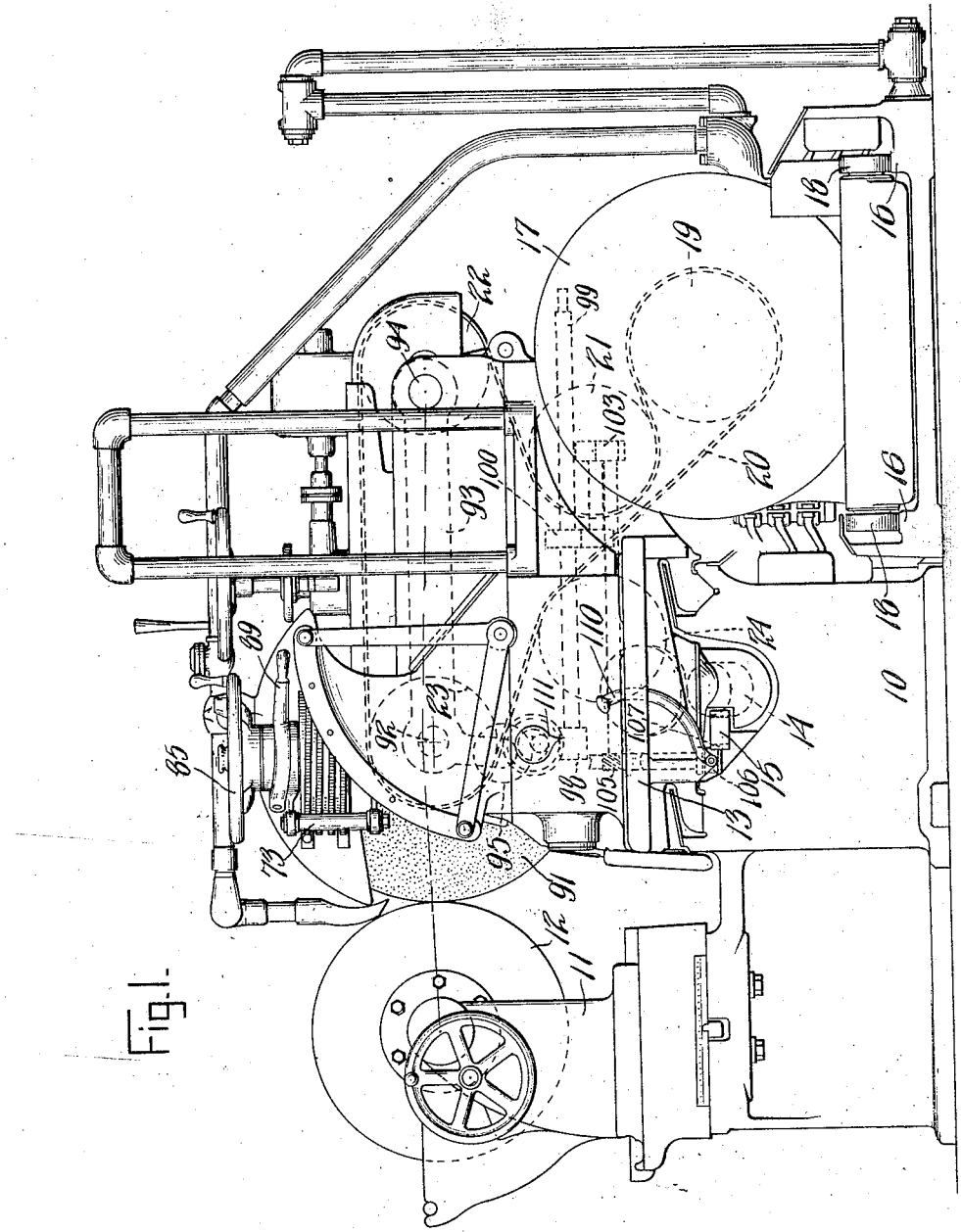

Nov. 30, 1926.

P. STONER 1,609,217

ROLL GRINDING MACHINE

Filed Dec. 19, 1923    3 Sheets-Sheet 1

Inventor
Paul Stoner
By
Attorney

Nov. 30, 1926. 1,609,217
P. STONER
ROLL GRINDING MACHINE
Filed Dec. 19, 1923   3 Sheets-Sheet 2
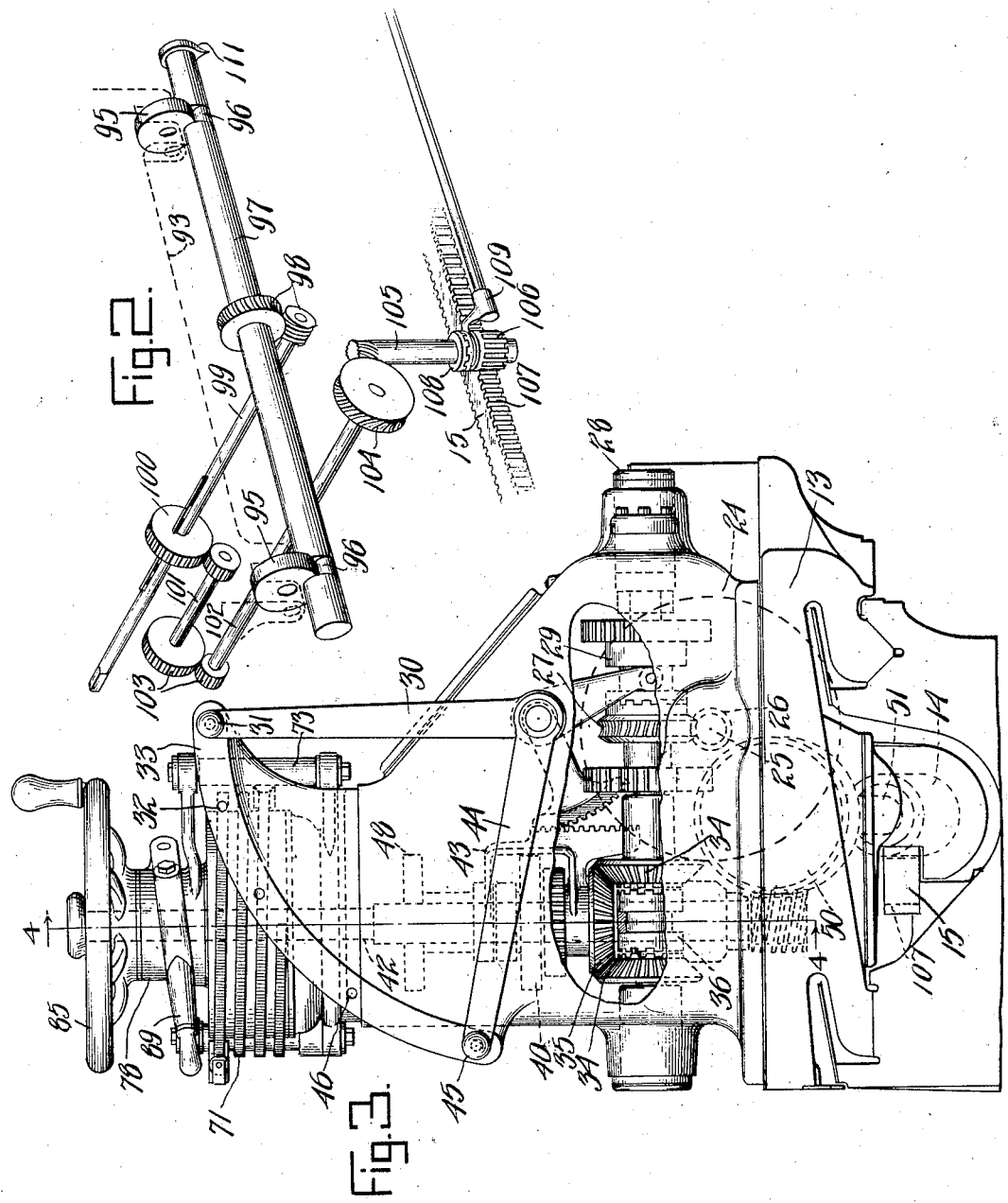
Inventor
Paul Stoner
By
Attorney

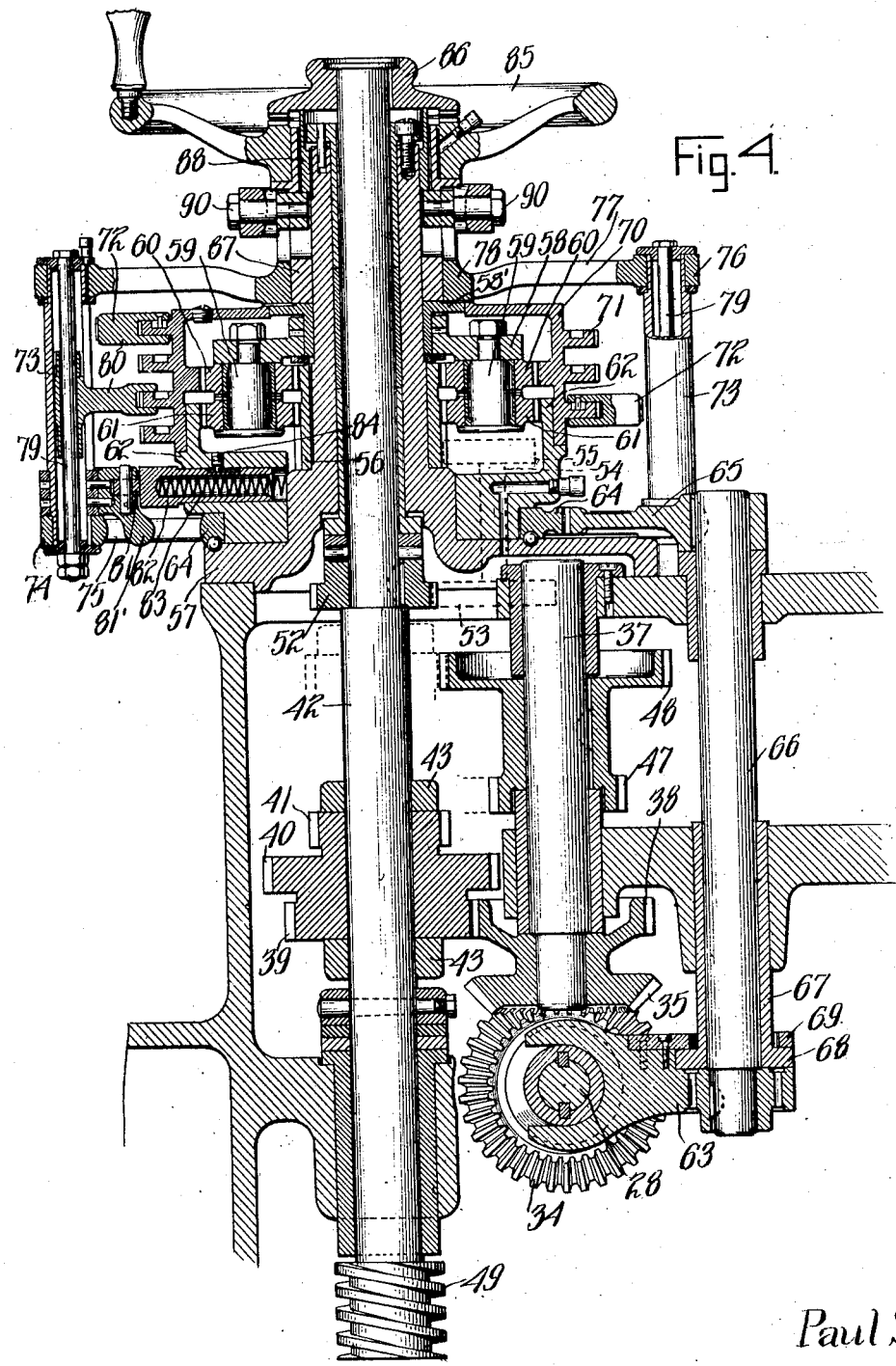

Patented Nov. 30, 1926.

1,609,217

UNITED STATES PATENT OFFICE.

PAUL STONER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

ROLL GRINDING MACHINE.

Application filed December 19, 1923. Serial No. 681,607.

My said invention relates to grinding machines and it is an object thereof to provide a machine which can be made of greater length than those hitherto in use.

A further object of the invention is to provide convenient means for operating the machine to grind convex or concave surfaces.

Referring to the accompanying drawings, which are made a part hereof and on which similar reference characters indicate similar parts, Figure 1 is an end elevation of my improved machine, Figure 2, a fragmentary perspective of certain gearing, Figure 3, a view similar to Figure 1 showing part of the machine on a larger scale.

Figure 4, a section on line 4—4 of Figure 3.

In the drawings reference character 10 indicates a frame at one side of which is a work-support 11 here shown as carrying a piece of work 12. Opposed to the work support is a traversing carriage 13 adapted to be moved back and forth by the engagement of a rotating spiral gear 14 with a rack 15 fixed to the frame of the machine. At the rear side of the carriage 13 tracks 16 are provided, these tracks supporting a carriage for a motor 17 and said carriage being provided with rollers 18 running on the tracks.

The shaft of the motor 17 has a pulley 19 shown in dotted lines over which a driving belt 20 passes. The belt 20 also passes successively over a series of pulleys comprising idlers 21 and 22 and driving pulleys 23 and 24.

The pulley 24 operates the traversing drive through a train of gearing comprising a shaft 25 (Fig. 3) on which the pulley is mounted, a worm 26 and a worm gear 27 on a shaft 28. A clutch member integral with worm gear 27 coacts with a clutch member 29 splined to shaft 28 for driving the shaft, said clutch member being operated by a lever 30 with means at 31 coacting with either one of a pair of holes 32 in a segment 33 to lock the lever in place and the clutch member in or out of engagement with the other clutch member. A pair of bevel gears 34 are mounted loosely on shaft 28, these gears meshing with a bevel gear 35. A slidable sleeve 36 is splined on the shaft 28 and said sleeve has clutch teeth at opposite ends adapted to engage clutch teeth on one or the other of bevel gears 34.

The bevel gear 35 is secured to one end of a vertical shaft 37 and has integral therewith a spur gear 38 meshing with a spur gear having three coaxial sets of teeth 39, 40 and 41. The last named gear is splined to a vertical shaft 42 and is adapted to be moved up and down on said shaft by means of a shifter 43 having arms embracing the shaft at both ends of the gear and having at its back a series of teeth forming a rack meshing with a similar series forming a segment rack on one arm of a bent hand lever 44 provided at its free end with a pin 45 adapted to engage in any one of a series of three holes 46 in the segment 33. The speed of shaft 42 may be varied according to the adjustment of the lever 44 whereby the teeth at 39 may be caused to engage with those at 38 or the teeth at 40 may engage teeth at 47 on another gear or the teeth at 41 may engage teeth at 48 integral with those at 47, the teeth 47 and 48 being formed on a gear splined to the shaft 37. At its lower end the shaft 42 has an oblique gear 49 meshing with an oblique gear 50 on an inclined shaft 51 carrying at its other end the oblique gear 14 meshing with the teeth of rack 15 for driving the carriage back and forth according to the position of the sleeve 36.

The controlling means for the carriage reversing drive acts through sleeve 36 as heretofore stated and comprises means driven through shaft 42 for moving said sleeve into engagement with one or the other of bevel gears 34. A pinion 52 on shaft 42 drives a pinion 53 on a shaft 54 bearing at its upper end a pinion 55 (Fig. 4) having teeth engaging gear teeth on a sleeve 56 concentric with shaft 42, said sleeve being separated from the shaft by an upper frame portion 57 having an elongated stationary sleeve surrounding shaft 42.

A spider 58 is mounted to rotate on a bearing 58′ which is interposed between the spider and the frame member 57 concentric with shaft 42 and above sleeve 56. This spider carries pins 59 and each pin has journaled thereon a pair of planetary gears 60 and 61. The teeth of the planetary gears 60 and 61 mesh at one side with the teeth of sleeve 56. At the other side the teeth of gear 61 mesh with a ring of internal gear teeth on an oscillatory actuator 62 for the shifter 63 of the reversing clutch sleeve 36, connection being made between the actuator and the shifter by ring 64 fixed to the actuator such ring having teeth at one side meshing with a segment rack 65 on a rockshaft 66. The rockshaft 66 is journaled at its lower end in a sleeve 67 fixed to the frame of the machine and the clutch shifting fork 63 is splined to the lower end of the rockshaft said arm being secured against vertical movement by a flange 68 on the sleeve 67 against the lower side of which the shifter bears while a separable part 69 of the fork rests on the upper face of the flange and is secured to the shifter fork by screws or in any other suitable manner.

The teeth of the planetary gears 60 engage at their outer side with internal gear teeth on a dog carrier 70 rotatably journaled on a bearing of actuator 62 and engaging also a flange of bearing 58' having a spiral track 71 on its periphery.

Dogs 72 on said track are adapted to be adjusted thereon about the carrier and fixed in adjusted position relative thereto. A pair of posts 73 are located on a spider secured to the actuator 62 and ring 64 said spider comprising an external ring 74 and spokes 75 connecting it to the ring 64. The posts 73 are hollow and serve as spacers to separate the lower spider from the upper spider which comprises an outer ring 76 and spokes 77 connected to a hub 78. Inside the posts are bolts 79 for holding the parts together and one of these bolts serves as a support for a sliding traveler 80 having a bearing encircling the bolt and extending through a slot in the bolt. At its other end the traveler has jaws embracing the edge of the track 71. Near its lower end the post shown at the left-hand side of Figure 4 has secured thereto an internal abutment bearing a roller 81 and having a downward projection 81' for manual actuation of the actuator. A yieldable detent 82 is forced outward by a spring 83 and is held against rotation or overthrow by a screw 84 having a reduced end engaging in a slot of the detent.

Above the upper spider means is provided for driving the carriage by hand said means comprising a hand wheel 85 loosely mounted on a bearing at the upper end of the frame member 57. The hub of the hand wheel has teeth at its upper end adapted to engage with teeth on a clutch member 86 splined to the shaft 42 and movable up and down on said shaft. A sleeve 87 concentric with the frame member 57 and preferably loosely mounted thereon to rest on dog-carrier 70 or on the bearing 58', is provided at its upper end with an internal recess in which slides a clutch actuator 88 for the clutch member 86 said clutch actuator being in the form of a sleeve having a relatively thick lower end and a thin annular fin at the upper end engaging the said clutch member. Operating means for the clutch actuator comprises a lever 89 pivotally mounted on the hub 78 of the upper spider and having pins 90 extending through slots in said hub and the sleeve 87 into engagement with the lower end of clutch actuator 88 said lever being held in adjusted position frictionally or by means of a detent or the like as preferred.

The drive for the grinding wheel 91 comprises the pulley 23 and its shaft 92 on which the grinding wheel is mounted. The grinding wheel shaft is journaled in a bracket 93 pivoted at 94 and this bracket has at its forward end depending arms on which are rotatably mounted rollers 95. The rollers 95 bear at their periphery on eccentrically reduced portions 96 of a shaft 97 driven by means of worm gearing 98 from a shaft 99. The shaft 99 has a spur gear 100 splined thereto in a manner to permit longitudinal movement of the shaft relative to the gear to allow for the cross feed of the wheel support. At its outer end the shaft 99 is squared to receive a crank by means of which the shaft 97 may be manually rotated for adjusting the position of the bracket and the wheel carried thereby. The normal drive for the shaft 99 is through gear 100 and its cooperating pinion on shaft 101 driven from a shaft 102 by spur gears 103. The shaft 102 carries an oblique gear 104 meshing with oblique teeth on a shaft 105 which shaft has secured thereto at its lower end a pinion 106 engaging teeth 107 at the front side of the rack 15. A clutch member 108 surrounds the shaft and is operated by a shifter 109 movable by means of a hand lever 110 (Fig. 1).

In the operation of my device the work revolves in a direction contrary to that of the wheel as usual, the wheel preferably revolving much faster than the work. The grinding wheel carriage reciprocates and the wheel is fed toward and from the work all in the usual manner. The gear teeth 39, 40 or 41 of the multiple gear may be connected to gear 38 or to either one of sets 47 and 48 according to the speed desired. The shaft 42 driven from the shaft 28 through the reversing and change-speed gearing acts through gears 52, 53 and 55 to drive the sleeve 56. The actuator 62 being stationary and the sleeve 56 being rotated the planetary gears 61 will be rotated about their pivots 59 and will travel about the inner surface of member 62 carrying with them the spider 58. As the spider is rotated about shaft 42 the gears 60 meshing with teeth on sleeve 56 will rotate at a speed proportioned to the relative speeds of rotation of the sleeve and the spider and will impart a relatively slow rotation to the track-supporting dog carrier 70 and as the dog carrier rotates the track will move sliding member 80 slowly up or down on rod 79 until one of the dogs 72 strikes the member 80 whereupon the post will be pushed in one direction or the other according to the direction of rotation of the dog carrier and will carry with it the actuator 62 by reason of its rigid connection thereto through rings 64 and 76 and the intervening parts. Roller 81 will force detent 82 back until the roller has passed after which the inertia of the parts and the force of the spring 83 will help to throw the actuator to its opposite position. This movement of the actuator with its rings 64 and 75 about the frame member 62 will, by reason of the engagement of the rack teeth on ring 64 and rock arm 65, cause the shaft 66 to be swung so as to move the sleeve 36 into engagement with the opposite one of bevel gears 34 to reverse the direction of carriage traverse.

Should it be found desirable to move the carriage by hand the lever 89 will be lowered to permit the clutch member 86 to engage the teeth on the hand wheel 85 the lever 44 being set to disconnect the change speed gears after which the hand wheel will be rotated to operate the shaft 42 and thus move the carriage in either direction as desired.

For grinding concave or convex surfaces on round work I have provided means whereby the wheel may be raised or lowered to vary its distance from the work progressively. Said means consists of the eccentric portions 96 of the shaft 97 on which the rollers 95 of the bracket 93 are shown to rest. The shaft 97 is driven as the carriage reciprocates by means of pinion 106 and stationary rack 107 driving through gearing 105, 104, 102, 103, 101, 100, 99 and 98. It will be seen that as the shaft 97 rotates the bracket and the grinding wheel carried thereby will be slowly raised and lowered in time with the reciprocation of the carriage thus varying the distance between the axes of the work and the wheel to vary the contour of the work. If this operation is not desired the clutch shifter 110 is operated to throw out the clutch 108 whereupon the gearing just mentioned will remain stationary.

I have provided means whereby the position of the wheel may be adjusted to vary the position of the high and low points of the curve generated in the operation just described. Such means comprises a pointer 111 on shaft 97 projecting outside the machine frame. A scale of any conventional or desirable type may be arranged to coact with this pointer. A crank is placed on the outer squared end of shaft 99 and the clutch 108 being disconnected the shaft 97 will be turned to raise or lower the bracket 93 for varying the position of the curve as for instance when it is desired to change from convex to concave or vice versa.

It will be obvious to those skilled in the art that many changes may be made in the device of my disclosure without departing from the spirit of the invention, and therefore I do not limit myself to the specific device shown in the drawings and described in the specification but only as indicated in the appended claims.

Having thus fully described my said invention, what I claim as new and desire to secure by Letters Patent, is:

1. In a grinding machine, a workholder, abrading means and means for traversing one of said parts relatively to the other including a carriage, means for traversing the carriage, traverse reversing means on the carriage, means also on the carriage for driving an element of said traverse reversing means and adjustable dogs on the carriage cooperating with said driven element to predetermine the length of carriage travel, substantially as set forth.

2. In a grinding machine, a traversing carriage, and means for reversing the direction of the traverse comprising a rotary member having a spiral track, dogs on the track, and means traveling on the track and cooperating with the dogs for reversing the direction of travel, substantially as set forth.

3. In a grinding machine, a traversing carriage, and means for reversing the direction of the traverse comprising a rotary member having a spiral track, dogs adjustably mounted on the track, and means traveling on the track and cooperating with the dogs for reversing the direction of travel at predetermined times, substantially as set forth.

4. In a grinding machine, a traversing carriage, a rotary spiral dog carrier on the carriage, and means cooperating therewith for reversing the direction of travel of the carriage, substantially as set forth.

5. In a grinding machine, a traversing carriage, and means for driving the same comprising a reversing clutch, an actuator therefor, a pair of shafts driven from said reversing clutch, speed changing gearing connecting said shafts, and means on one of said shafts for manually operating the carriage, substantially as set forth.

6. In a grinding machine, a workholder, an abrading device, a carriage for one of said elements and means for traversing said carriage comprising a shaft, means for driving said shaft including a reversible clutch, a shifter therefor, means for operating the shifter including a dog-carrier on the carriage driven by said shaft, and connections from the dog-carrier to the shifter, substantially as set forth.

7. In a grinding machine, a workholder, an abrading device, a carriage for one of said elements, means for traversing said carriage comprising a shaft, means for driving said shaft including a reversible clutch, a shifter therefor, means for operating the shifter including a dog-carrier on the carriage driven by said shaft, and connections from the dog-carrier to the shifter said dog-carrier being concentric with said shaft, substantially as set forth.

8. In a grinding machine, a workholder, an abrading device, a carriage for one of said elements, means for traversing said carriage comprising a shaft, means for driving said shaft including a reversible clutch, a shifter for said clutch, means for operating the shifter including a dog-carrier on the carriage driven by said shaft, connections between the shifter and the dog-carrier said dog-carrier being concentric with said shaft and having a peripheral flange, and dogs adjustably mounted on said flange, substantially as set forth.

9. In a grinding machine, a workholder, an abrading device, a carriage for one of said elements, means for traversing said carriage comprising a shaft, means for driving said shaft including a reversible clutch, a shifter for said clutch, means for operating the shifter including a dog-carrier on the carriage driven by said shaft, connections between the shifter and the dog-carrier said dog-carrier being concentric with said shaft and having a spiral external flange, and dogs adjustably mounted on said flange, substantially as set forth.

10. In a grinding machine, a workholder, an abrading device, a carriage for one of said elements and means for traversing said carriage comprising a shaft, means for driving said shaft including a reversible clutch, a shifter for the clutch, means for operating the shifter including a dog-carrier on the carriage driven by said shaft, an actuator between said dog-carrier and said shifter, means for holding said actuator in either one of two extreme positions, and dogs on the carrier adapted to engage and shift said actuator, substantially as set forth.

11. In a grinding machine, a workholder, an abrading device, a carriage for one of said elements and means for traversing said carriage comprising a shaft, means for driving said shaft including a reversible clutch, a shifter therefor, means for operating the shifter including a dog-carrier on the carriage driven by said shaft, an actuator mounted concentrically with said shaft and dog-carrier, and dogs on the carrier adapted to engage alternately with an abutment on the actuator, substantially as set forth.

12. In a grinding machine, a workholder, an abrading device, a carriage for one of said elements, means for traversing said carriage comprising a shaft, means for driving said shaft including a reversible clutch, a shifter for the clutch, means for operating the shifter including a dog-carrier on the carriage driven by said shaft, connections between the shifter and the dog-carrier said dog-carrier being concentric with said shaft and having a spiral flange, dogs adjustably mounted on said flange, a post on the actuator parallel to said shaft, and an abutment slidably supported by said post said abutment being connected to said flange for movement into the path of said dogs, substantially as set forth.

13. In a grinding machine, an abrading device, a workholder, a reciprocating carriage for one of said elements, and means for imparting reciprocating movement to said carriage including reversible power-transmitting means, and a rotary controller therefor on the carriage, substantially as set forth.

14. In a grinding machine, an abrading device, a workholder, a reciprocating carriage for one of said elements, and means for imparting reciprocating movement to said carriage including reversible power transmitting means, traversing means for the carriage including a controller on the carriage for operating the reversing means, and variable connections between said controller and said reversing means, substantially as set forth.

15. In a grinding machine, abrading means, work-holding means, a reciprocating carriage for one of said means, a shaft on said carriage, reversible driving means for the shaft, a dog-carrier surrounding the shaft, planetary gearing connecting the shaft and the dog-carrier, and means connected to said dog-carrier for reversing said driving means, substantially as set forth.

16. In a grinding machine, abrading means, work-holding means, a reciprocating carriage for one of said means, a vertical shaft on said carriage, reversible driving means for the shaft, a dog-carrier surrounding the shaft, planetary gearing connecting the shaft and the dog-carrier, a handwheel at the upper end of the dog-carrier, a clutch member above the handwheel, a sleeve within the hub of the wheel adapted to hold said clutch member away from the wheel, and a lever having a yoke engaging the sleeve at opposite sides for operating the clutch member, substantially as set forth.

17. In a grinding machine, a rotary work holder, a rotary grinding wheel, means for traversing one of said parts longitudinally relatively to the other, a pivoted bracket supporting one of said rotary parts the axes of the work holder and the grinding wheel being normally in a common plane with the pivot of the bracket, and means operating on the bracket to move the axis of the member carried thereon progressively away from and back to said plane, substantially as set forth.

18. In a grinding machine, a rotary work holder, a rotary grinding wheel, means for traversing one of said parts longitudinally relatively to the other including a traversing carriage, means for traversing the carriage including a rack fixed to the machine frame, and means for moving the grinding wheel relatively to the work holder including a pinion meshing with teeth on said rack, substantially as set forth.

19. In a grinding machine, abrading means, a workholder, means to rotate one of said elements, means for traversing one of said elements relatively to the other, and means for moving one element progressively toward and from the other during a traverse in one direction including a cam rotating on an axis parallel to that of the rotary element, substantially as set forth.

20. In a grinding machine, a workholder, a grinding wheel, means for rotating the work and the wheel oppositely, a traversing carriage for the wheel, and means for moving one of said elements toward and from the other during a traverse of the carriage in one direction including a cam rotating on an axis parallel to those of the wheel and the work, substantially as set forth.

21. In a grinding machine, a workholder, a grinding wheel, a carriage for the wheel, a bracket on the carriage supporting the wheel, means for traversing the carriage including a rack bar fixed on the machine frame said rack bar having teeth and gearing on the carriage cooperating therewith, and means for moving the bracket progressively toward and from the work during a traverse in one direction including a second set of teeth on said rack-bar and gearing on the carriage cooperating therewith, substantially as set forth.

22. In a grinding machine, work-rotating means, an abrading device, means for rotating the abrading device, means for traversing one of said parts relatively to the other, and means for moving one of said elements progressively toward and from the other during a traverse in one direction including a rack fixed to the machine frame, and gearing connecting said last-named means to said rack, substantially as set forth.

23. In a grinding machine, a grinding wheel, work-rotating means, means for rotating the grinding wheel, means for traversing one of said parts relatively to the other, means for moving one of said elements progressively toward and from the other during a traverse in one direction including a rack fixed to the machine frame, gearing connecting said last-named means to said rack, a clutch forming part of said gearing, and manual means whereby said clutch may be disconnected, substantially as set forth.

24. In a grinding machine, a workholder, an abrading device, a traversing carriage for one of said elements, a pivoted bracket on said carriage for supporting said element, spaced rollers on said bracket, a shaft underneath said bracket having eccentric parts on which said rollers are supported, and means for rotating said shaft in timed relation with the traverse of the carriage, substantially as set forth.

25. In a grinding machine, a workholder, an abrading device, a traversing carriage for one of said elements, a pivoted bracket on said carriage for supporting said element, a rack on the machine frame, and connections between said rack and the bracket to move the bracket on its pivot during the traverse of the carriage, substantially as set forth.

26. In a grinding machine, work-rotating means, a rotary grinding wheel, means for traversing one of said parts relatively to the other, means for moving one of said elements progressively toward and from the other during a traverse in one direction including a shaft, means for driving the shaft, and a clutch for stopping and starting the rotation of the shaft.

27. In a grinding machine, work-rotating means, a rotary grinding wheel, means for traversing one of said parts relatively to the other, means for moving one of said elements progressively toward and from the other during a traverse in one direction, a manually-operated clutch for intermitting the last-named movement, and manually-operable means for setting said progressive means while said clutch is disconnected, substantially as set forth.

28. In a grinding machine, a holder for rotating work, a rotary abrading device, means for traversing one of said devices axially, and means for moving one of said devices bodily toward and from the other during such traversing movement including a rotating cam and connections for transmitting the movement of the cam positively to said device, substantially as set forth.

29. In a grinding machine, a work-rotating means, a rotary grinding wheel, means for traversing one of said parts relatively to the other, means for moving one of said elements progressively toward and from the other during a traverse in one direction including a driven element, and means for interrupting the drive for said element, substantially as set forth.

30. In a grinding machine, a fixed bed, a rack on the bed, a traversing carriage, a gear on the carriage meshing with the teeth of the rack, a motor on the carriage for driving said gear to traverse the carriage, and traverse reversing means mounted wholly on said carriage and deriving its motion from said gear, substantially as set forth.

31. In a grinding machine, a fixed bed, a traversing carriage thereon, driving means on the carriage, connections from said driving means to said bed for traversing the carriage, and a control on said carriage intergeared with said connections for adjustably determining the length of travel of the carriage, substantially as set forth.

32. In a grinding machine, a fixed bed, a traversing carriage thereon, driving means on the carriage, connections from said driving means to said bed for traversing the carriage, and means on said carriage for determining the length of travel of the same said means including a pair of adjustable reversing dogs, substantially as set forth.

In witness whereof, I have hereunto set my hand at Waynesboro, Pennsylvania, this 7th day of December, A. D. nineteen hundred and twenty-three.

PAUL STONER.